United States Patent

Kalabukhova et al.

[11] 4,013,248
[45] Mar. 22, 1977

[54] PARACHUTE EQUIPMENT

[76] Inventors: Ljudmila Nikolaenva Kalabukhova, Kutuzovsky prospekt, 45, kv. 52; Svetlana Ivanovna Rudevskaya, prospekt mira, 184, kv. 192; Alexandr Alexandrovich Petrighenko, Amurskaya ulitsa, 21, korpus 2, kv. 2; Alberta Sergeevna Smurova, Amurskaya ulitsa 19, kv. 23, all of Moscow, U.S.S.R.

[22] Filed: May 30, 1975

[21] Appl. No.: 582,188

Related U.S. Application Data

[63] Continuation of Ser. No. 432,157, Jan. 10, 1974, abandoned, which is a continuation of Ser. No. 320,681, Jan. 2, 1973, abandoned.

[52] U.S. Cl. .............................. 244/145; 244/152
[51] Int. Cl.² ......................................... B64D 17/18
[58] Field of Search ....... 244/142, 145, 152, 138 R

[56] References Cited

UNITED STATES PATENTS

| | | | |
|---|---|---|---|
| 3,099,426 | 7/1963 | Lemoigne | 244/152 |
| 3,136,508 | 6/1964 | Sepp, Jr. | 244/145 |
| 3,173,636 | 3/1965 | Sepp, Jr. | 244/152 |
| 3,228,636 | 1/1966 | Lemoigne | 244/152 |
| 3,298,639 | 1/1967 | Heinrich et al. | 244/152 |
| 3,385,540 | 5/1968 | Basnett | 244/152 |
| 3,433,441 | 3/1969 | Cummings | 244/138 R |

Primary Examiner—Trygve M. Blix
Assistant Examiner—Galen L. Barefoot
Attorney, Agent, or Firm—Holman & Stern

[57] ABSTRACT

A parachute having a canopy defined by 24 gores, the crown of the canopy being drawn by means of a central shroud-line; the canopy being operated by valves with nozzles directing the air-flow off the center of the canopy and a group of vents to reduce dynamic loads at the moment of deployment of the parachute; the canopy having an arrangement of radial slots in its central section; to improve the parachute's reliability, the canopy is provided with nozzles directing the air-flow towards the center of the canopy; the canopy being operated by means of control shroud lines with one of the ends of the lines attached to free hems of the valves, while the other ends of the control shroud lines being provided with hand-grip knobs for operation by the user of the parachute.

2 Claims, 7 Drawing Figures

PARACHUTE EQUIPMENT

This is a continuation of application Ser. No. 432,157 filed Jan. 10, 1974 which in turn is a continuation of Ser. No. 320,681 filed Jan. 2, 1973, both of which are now abandoned.

BACKGROUND OF THE INVENTION

The present invention relates to parachute equipment, and more particularly to parachutes with high touch-down accuracy.

PRIOR ART

Known in the art are different types of guided parachutes, for example, the "Para-Commander" (US), "Olimpiek" (France) and "Papillon" (US).

The "Para-Commander" chute has a canopy of 24 radial gores with a central shroud line, a system of nozzles and a number of vents in the rear section of the canopy; the nozzles drive the air flow off the crown, while the vents are placed at the hem of the canopy. One of these vents is central, cut in one gore and rectangular in shape; the two others are placed symmetrically on both sides of the central vent, with each being cut in one gore and triangular in shape. The parachute's canopy is provided with stabilizing gores arranged in diametrically opposite sides of its periphery. In the stabilizing gores' sectors, the canopy is provided with controlled valves.

This parachute has a number of disadvantages, including considerable dynamic loads at the moment of deployment which have an unfavorable effect upon the parachutist, a low L/D ratio and intensive lateral swinging following a decrease in the horizontal travel speed.

The French "Olimpiek" parachute French Pat. No. 1,350,702) also has a canopy of 24 gores, provided with a central shroud line, stabilizing gores, a system of nozzles, controllable valves and a number of vents, with the nozzles and vents being placed in the rear half of the canopy and the valves being arranged in the sectors of the canopy's stabilizing gores.

In addition, there are nozzles in the front half of the canopy which direct the air flow to the center of the canopy.

In the central section of the canopy, there are several slots cut radially along the center of the gores to reduce dynamic loads on the canopy. Like the "Para-Commander", the "Olimpiek" parachute has a low L/D ratio and suffers from such disadvantages as great dynamic loads at the moment of deployment and great lateral swinging following a reduction in the horizontal travel speed.

The American "Papillon" parachute is essentially a modification of the French "Olimpiek" chute; it is marked by an increased length of the controlled valves which reduces to some extent the horizontal travel speed and raises the parachute's L/D ratio. However, such substantial disadvantages of the "Olimpiek" parachutes as considerable dynamic loads on the canopy at the moment of deployment and great lateral swinging following a decrease in a horizontal travel speed are also typical of the "Papillon" parachute.

Moreover, all said types have a common disadvantage which is inadequate controllability of the canopy at a wind speed of over 5 m/sec, because their horizontal travel speed and directional stability are inadequate for such winds.

OBJECTS AND SUMMARY OF THE INVENTION

It is an object of the present invention to provide a parachute with a canopy design making for high touch-down accuracy both in calm weather and with a strong wind.

Another object of the present invention is to provide a parachute whose canopy design ensures safe jumping with an instantaneous deployment of the parachute under the aircraft, or in case of any delay of its opening in the air.

These and other objects are attained in a parachute with a canopy of radial gores and a central shroud line, which has a system of radial slots in the central section of the canopy extending down to the fold line, with diametrically opposite stabilizing gores attached to the periphery of the canopy in whose sectors there are radial controlled valves extending up to the canopy's fold line; in one of the two other sectors of the canopy there are nozzles directing the air flow radially to the center of the canopy, while in the other, there are nozzles directing the air flow radially off the center of the canopy, and also a plurality of vents.

According to the invention, the latter includes one central vent which stretches along the hem of the canopy in the zone of several radial gores, and lateral vents placed symmetrically at the sides of the central vent which stretch from the hem of the canopy to the fold line; between the central and lateral vents there are nozzles directing the air flow radially from the center of the canopy.

In an alternative embodiment, the ratio between the total area of the group of vents in the sector of the canopy between the sectors of the stabilizing gores and the area of that sector is 2:15, while the ratio between the area of each lateral vent and that of the central vent of the same sector of the canopy is 3:5.

One of the embodiments of the present invention envisages a system of radial slots in the central part of the canopy, along the radial seams of the canopy.

A parachute made in accordance with the present invention has an increased L/D ratio, i.e. its rate of descent is decreased and its horizontal travel speed is raised as a result of an optimum reactive force due to the provision of a group of vents in the canopy. A specific ratio between the areas of these vents ensures an optimum value of the reactive force due to an increased directional air flow from under the canopy during descent.

An increased L/D ratio ensures a high touch-down accuracy under any weather conditions.

Furthermore, vents provided in the seams of the central section of the canopy have made it possible to reduce by one half the dynamic loads on the canopy at the moment of deployment, as compared to the prior art parachutes. They have made it possible to prolong the parachute's service life and ensure safe jumping with an instantaneous deployment of the parachute under the aircraft or in case of an eventual delay of its opening in the air.

Other objects and advantages of the present invention will be more fully understood from the following detailed description of an embodiment thereof in conjunction with the attached drawings, wherein:

DETAILED DESCRIPTION OF THE INVENTION

Figure 1:
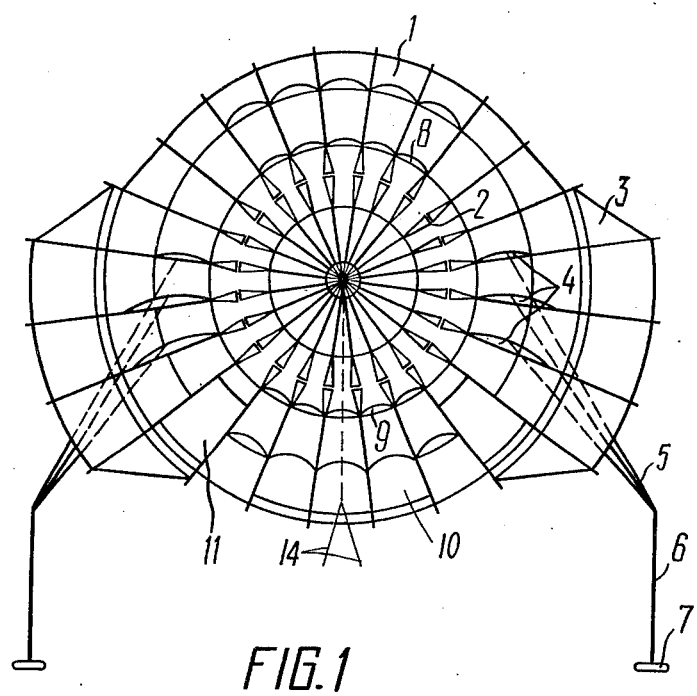
FIG. 1 is a top view of the canopy of the parachute, according to the invention.

A parachute (FIG. 1) made according to the invention comprises a canopy consisting of 24 radial gores 1. The canopy has central shroud line 14 attached to the apex of the canopy, which serves to draw in the central section of the canopy. Provided in the central section along the radial seams of the gores 1 down to their fold lines are slots 2 for reducing the dynamic loads at the moment of deployment.

The canopy has stabilizing gores 3 which are arranged on diametrically opposite sides thereof, next to its hem. The stabilizing gores 3 are attached to shroud lines and arranged so that there is a small gap between such gores and the hem of the canopy.

Placed in the sectors of the canopy adjacent to the stabilizing gores, are controlled valves 4, each defined by a slot between a portion of a radial seam of the gores 1 and the free hem of an adjoining gore 1 overlapping; it, with the length of the slots exceeding that of said portion of the radial seam. Attached to the valves 4 of each sector and to the hems above them are control shroud lines 5 which converge to form one control shroud line 6 ending in a grip knob 7 which is used by the parachutist to operate the control shroud lines. The valves 4 are arranged radially and extend down to the fold line of the canopy. The valves 4 enable the parachutist to make a 360° turn of the canopy and reduce the speed of the parachute's horizontal travel.

In accordance with the invention, the canopy of the parachute is provided with two groups of nozzles, 8 and 9, each being formed by a slot across a radial gore with two free hems, with one being longer than the other. The nozzles 8 and 9 are placed in the canopy's sectors which are between those adjacent to the stabilizing gores 3, with the first nozzles 8 in one of the sectors directing the air flow toward the center of the canopy, while the nozzles 9 in the diametrically opposite sector direct the air flow off the center of the canopy. The nozzles 9 are to impart to the canopy a horizontal travel speed, while the nozzles 8 are to prevent sticking of the canopy as it is being filled with air and thus improve the parachute's reliability. In the sector of the nozzles 9, there is also a group of vents, a central vent 10 stretching along the hem of the canopy in the zone of several (three) gores 1, while other vents 11 are lateral and placed at the sides of the vent 10 between the hem of the canopy and the fold line. Between the vents 10 and 11 there are nozzles directing the air flow radially off the center of the canopy.

The vents 10 and 11 are arranged in such a way that their total area relates to that of the canopy's sector in which they are placed as 2:15, while the ratio between the area of each lateral vent 11 and that of the central vent 10 is 3:5.

Figure 2:
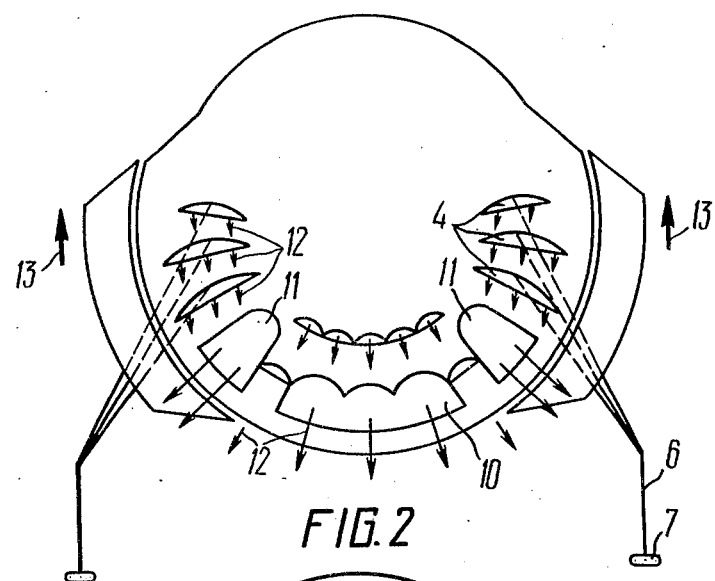
FIG. 2 is a view showing the positions of the valves and vents on the canopy as the parachute moves in one direction.

The present parachute operates as follows:

The canopy is operated by the control shroud lines 6. In case the shroud lines 6 which end in the grip knobs 7 are not held by the parachutist (FIG. 2), the air escapes through the valves 4 and the vents 10 and 11 and the parachute moves forward. In FIG. 2, arrows 12 indicate the direction of the escaping air, while arrows 13 indicate the direction of the parachute's motion.

Figure 3:
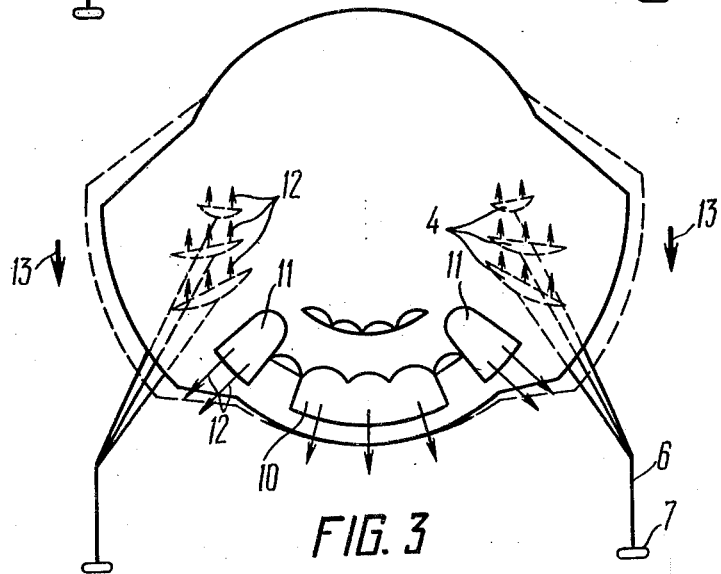
FIG. 3 is a view showing the positions of the valves and vents on the canopy as the parachute moves in the opposite direction.

The speed of the forward motion depends upon the area of the vents closed by the valves 4, i.e. the position of the grip knobs 7. Following a downward motion of the grip knob 7, the control shroud lines 6 shift the free hem of the valves 4 inside, thereby closing the vents in the valves, which changes the direction of the air flow from under the valves 4 (FIG. 3) and brakes the canopy. In FIG. 3, arrows 12 indicate the direction of the escaping air and arrows 13, the direction of the parachute's motion.

With a maximum pull at the control shroud lines 6, i.e. with a maximum inward shift of the free hem of the valves 4, the parachute starts moving backwards.

The parachute is turned by moving one grip knob 7 down; the control shroud 6 then shifts the free hem of the valve 4 inwards thus producing a torque.

Figure 4:
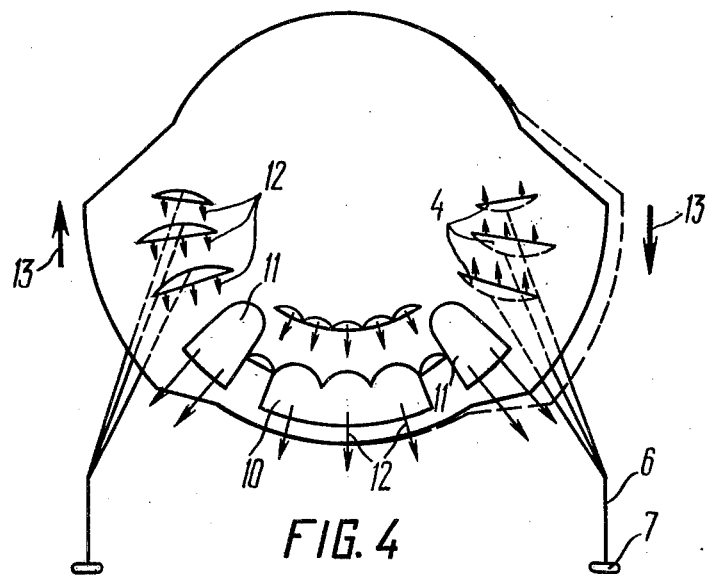
FIG. 4 is a view showing the positions of the valves and vents on the canopy during a turn of the parachute.

In FIG. 4, arrows 12 indicate the direction of the escaping air and arrows 13, the direction of the parachute's motion.

Figure 5:
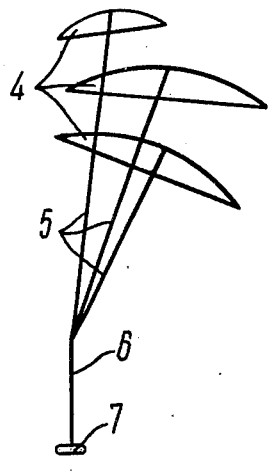
FIG. 5 is a schematic representation of the operation of the valves at a maximum speed of the parachute's horizontal travel.
Figure 6:
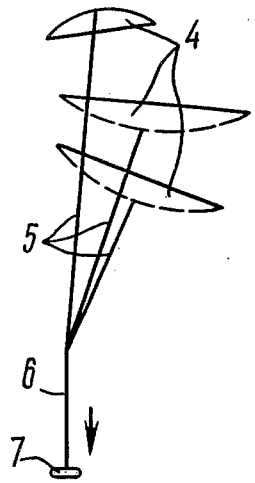
FIG. 6 is a schematic representation of the operation of the valves in the braking regime to reduce the speed of the horizontal travel of the parachute.
Figure 7:
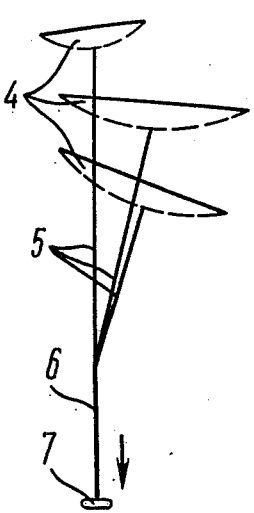
FIG. 7 is a schematic representation of the operation of the valves at a maximum braking of the speed of the horizontal travel of the parachute.

The valves 4 operate in consecutive order, which ensures a smooth change from the forward motion to a complete brake and the backward motion, thereby making for a high touch-down accuracy (FIGS. 5, 6 and 7).

The performance characteristics of the novel parachute made in accordance with the invention, and its advantages over the prior art parachutes are shown in Table 1; the tabulated data has been obtained as a result of testing the novel parachute in flight conditions.

Table 1

| No. | Parachute type | Canopy area, $m^2$ | L/D ratio, K | Horizontal travel speed of parachinte m/sec | Rate of descent of canopy, m/sec | Time of 360° turn, sec | Dynamic loads, kg |
| --- | --- | --- | --- | --- | --- | --- | --- |
| 1. | applicants | 51 | 1 | 5.1 | 5.1 | 3.5–4 | 430–800 |
| 2. | "Olimpiek" | 51 | 0.87 | 5.0 | 5.75 | 3.5–4 | 800–1400 |
| 3. | "Papa-Commander" | 45 | 0.86 | 4.8 | 5.3 | 3.5–4 | 600–1,460 |
| 4. | "Papillon" | 51 | 0.9 | 5.0 | 5.5 | 3.5–4 | 800–1,400 |

K is the L/D ratio, i.e. a ratio between the parachute's horizontal travel speed and that of its rate of descent.

What is claimed is:

1. A parachute provided with a canopy defined by radial gores joined together by radial seams, comprising a central shroud line; a system of radial vents in a central section of said canopy extending down to a fold line in the canopy and along a radial seam to reduce dynamic loads at the moment of deployment; stabilizing gores adjacent the periphery of said canopy at diametrically opposite sides; controlled valves disposed radially in canopy-sectors bounded by said stabilizing gores and reaching said fold line, each controlled valve being defined by a slot between a portion of a radial seam and a free hem of an adjoining gore overlapping it, the length of the slot exceeding that of said portion of the radial seam; first nozzles radially directing the air flow to the center of the canopy, constituted by a slot across a radial gore with two free hems, the length of one hem exceeding that of the other hem, and arranged at one side of the canopy between the sectors of said stabilizing gores; second nozzles adapted to direct the air flow radially off the center of said canopy, said second nozzles being constructed as said first nozzles and on the opposite side of said canopy between the sectors of said stabilizing gores; a group of vents in the sector of the second nozzles of the canopy including a central vent extending along the hem of the canopy across several radial gores, and lateral vents disposed symmetrically at the sides of said central vent between the hem of the canopy and said fold line of the canopy.

2. The parachute as claimed in claim 1, in which the ratio between the total area of the group of vents in the sector of the second nozzles and the area of said sector of the canopy is 2:15, while the ratio between the area of each lateral vent and the central vent of the same sector is 3:5.

* * * * *